United States Patent
Yasuda et al.

(10) Patent No.: US 9,131,702 B2
(45) Date of Patent: Sep. 15, 2015

(54) FOOD MATERIAL CUTTER

(71) Applicant: CHUBU CORPORATION, Kuwanashi, Mie (JP)

(72) Inventors: Norimitsu Yasuda, Kuwansashi (JP); Katsuhisa Saito, Kuwanashi (JP)

(73) Assignee: CHUBU CORPORATION, Kuwanashi (JP)

( * ) Notice: Subject to any disclaimer, the term of this patent is extended or adjusted under 35 U.S.C. 154(b) by 0 days.

(21) Appl. No.: 14/245,616

(22) Filed: Apr. 4, 2014

(65) Prior Publication Data

US 2014/0360331 A1   Dec. 11, 2014

(30) Foreign Application Priority Data

Jun. 11, 2013 (JP) ................................. 2013-122379

(51) Int. Cl.
*A21C 15/04* (2006.01)
*B26D 3/30* (2006.01)

(52) U.S. Cl.
CPC . *A21C 15/04* (2013.01); *B26D 3/30* (2013.01); *Y10T 83/739* (2015.04)

(58) Field of Classification Search
CPC ...... A26D 3/30; Y10S 83/932; B26B 29/063; A21C 15/04
USPC ................... 83/761, 454, 464, 870, 465, 932, 83/762–767, 874, 167, 446, 153; 269/87.2, 236, 238, 295, 288; 99/537, 99/468.8, 468.2, 391
See application file for complete search history.

(56) References Cited

U.S. PATENT DOCUMENTS

| | | | | |
|---|---|---|---|---|
| 3,583,026 A | * | 6/1971 | Peoni | 452/16 |
| 4,220,065 A | | 9/1980 | Stanford | |
| 5,404,782 A | * | 4/1995 | Ryan et al. | 83/873 |
| 5,690,013 A | * | 11/1997 | Kanarek et al. | 83/762 |
| 6,128,996 A | | 10/2000 | Sato et al. | |
| 6,244,153 B1 | | 6/2001 | McInnes et al. | |
| 6,647,850 B2 | * | 11/2003 | Verklan | 83/874 |

FOREIGN PATENT DOCUMENTS

| | | |
|---|---|---|
| JP | 55-84 A | 1/1980 |
| JP | 11-188692 A | 7/1999 |

* cited by examiner

*Primary Examiner* — Ghassem Alie
(74) *Attorney, Agent, or Firm* — Birch, Stewart, Kolasch & Birch, LLP (57) ABSTRACT

The food material cutter of the present invention has a feeding port for feeding a doughnut, titled plates and guiding plates for guiding the fed doughnut, and rotary blades for slicing the guided doughnut in half in the thickness direction. The link mechanism causes the tilt angles of the tilted plates to be increased due to the own weight of the doughnut, and causes the guiding plates to move by an equal distance from the center of the clearance between the respective guiding plates while matching with the thickness of the doughnut. The doughnut-is guided by the titled plates and guiding plates, and falls down to the palette in a state where it is sliced in half in the thickness direction.

5 Claims, 7 Drawing Sheets

FIG. 8

FOOD MATERIAL CUTTER

BACKGROUND OF THE INVENTION

1. Field of the Invention

The present invention relates to a food material cutter for slicing a food material in half in the thickness direction, and can be suitably used to slice ring-shaped and disk-shaped food materials such as doughnuts and bagels.

2. Description of Related Art

Doughnuts sliced in half in the thickness direction with cream or the like being sandwiched between the two doughnut pieces are sold and have achieved popularity. Bagels are also sliced into two pieces to sandwich cheese, jam or the like therebetween. Conventionally, these ring-shaped food materials have been sliced in half in the thickness direction manually by means of a kitchen knife. Also, there have been developed slicing holders comprising a guiding means which fixes such ring-shaped food materials and guides a blade edge to slice them evenly in half (see JP H11-188692 A).

Further, hamburger cutters for snicking a hamburger bun are known (see JP S55-84 A).

SUMMARY OF THE INVENTION

Problem to Be Solved by the Invention

However, there are various ring-shaped food materials such as doughnuts, including airy and soft food materials and food materials having sticky texture. Since these food materials are easily deformed when sliced in half with a kitchen knife, such slicing operations require skill and are troublesome.

In this regard, operators skilled to a certain extent can slice such a food material in half by using the above-described slicing holder. However, even in a case where the slicing holder is used, it is necessary to do operations such as housing a doughnut or the like in the holder, inserting a blade edge into a slit provided in the holder and taking out the sliced doughnut pieces. Therefore, the slicing operations are still troublesome, and cannot be said to be efficient.

The present invention has been made to solve the above-described conventional problem, and a problem to be solved thereby is to provide a food material cutter by which any operator can easily, accurately and rapidly slice ring-shaped and disk-shaped food materials such as doughnuts and bagels in half regardless of the degree of skill of the operator.

Means for Solving the Problem

A food material cutter according to a first aspect of the invention includes a guiding means which guides a food material to a sliceable position and a cutting means having a cutting blade for slicing the guided food material, and is characterized in that:

the guiding means is provided with a feeding part into which the food material is to be fed, a pair of opposite guiding plates for guiding the food material fed into the feeding part to the cutting means, and a centering mechanism which moves the guiding plates by an equal distance from the center of the clearance between the respective guiding plates while the respective guiding plates matches with the thickness of the food material due to the own weight of the food material fed from the feeding part, and the blade edge of the cutting blade is provided so as to pass over the central plane between the guiding plates, and configured so that the food material guided by the guiding plates is cut in half from the center of the thickness direction by means of the cutting blade.

In the food material cutter according to the first aspect, a food material such as a doughnut, when fed from the feeding part, passes between the pair of opposite guiding plates, and falls downward by its own weight. At this time, the guiding plates move by an equal distance from the center of the width direction while the space between the guiding plates matches with the thickness of the food material by the centering mechanism. Therefore, the food material falls down such that the center of the width direction of the food material is constantly on the central plane between the guiding plates. Further, the fallen food material is sliced in half from the center of the thickness direction by a cutting means provided so that the blade edge passes over the central plane between the guiding plates.

Thus, the food material cutter according to the first aspect enables any operator to easily, accurately and rapidly slice a food material such as a doughnut in half just by feeding it into the feeding part, regardless of the degree of skill of the operator.

Examples of the cutting means include a means in which a blade edge provided on the circumferential edge of a rotating disk is rotated on the central plane between the guiding plates, as well as a means in which a band-shaped blade is reciprocated on the central plane between the guiding plates and a means in which a looped band-shaped blade is cyclically rotated so as to pass over the central plane between the guiding plates.

A food material cutter according to a second aspect of the invention is characterized in that the cutting blades include first and second rotary blades which are made rotatable mutually inversely in a direction of rolling in the food material, and are provided on the central plane between the guiding plates.

According to the food material cutter according to the second aspect, the first and second rotary blades are provided on the central plane between the guiding plates, and the food material has also fallen along the central plane between the guiding plates. Therefore, the food material is sliced in half from the center of the thickness direction with the first and second rotary blades.

A food material cutter according to a third aspect of the invention is characterized in that the straight lines formed by projecting the rotation trajectories of the first and second rotary blades onto a horizontal plane are in contact or overlap with each other. This makes it possible to surely slice the food material in half without leaving an uncut part of the food material.

A food material cutter according to a fourth aspect of the invention is characterized in that the feeding part has a pair of tilted plates which are open upward, and is configured so that the space between the lower ends of the respective titled plates widens due to the own weight of the food material, and that the titled plates or the tilted plates and the guiding plates are coupled by a link mechanism so that the wider the space is, the greater the moving distance from the center of the clearance between the respective guiding plates is.

According to the food material cutter according to the fourth aspect, the food material is easily fed since the feeding part is open upward. Also, since the feeding part is configured so that the space between the lower ends of the respective titled plates widens due to the own weight of the food material, the food material, when fed, can be automatically guided between the guiding plates without using any motive power. Further, the food material guided between the guiding plates by its own weight can be guided while the width between the guiding plates is automatically adjusted to match with the thickness of the food material, and can be automatically guided to an optimum position to be sliced in half from the center of the thickness direction, since the titled plates are coupled by the link mechanism and also the tilted plates and the guiding plates are coupled by the link mechanism so that the wider the space between the tilted plates is, the greater the moving distance from the center of the clearance between the respective guiding plates is.

A food material cutter according to a fifth aspect of the invention is provided with an energizing means which energizes the guiding plates to a direction of narrowing the distance between the guiding plates. This makes it possible to accurately guide the food material to an optimum position for slicing, since the food material is constantly guided in contact with the guiding plates.

A food material cutter according to a sixth aspect of the invention is characterized in that the energizing means energizes the guiding plates due to the own weight of a weight, the guiding plates and the weight being coupled by the link mechanism.

This makes it possible to accurately guide the food material to an optimum position for slicing constantly without using any motive power.

DETAILED DESCRIPTION OF PREFERRED EMBODIMENTS

Hereinafter, the doughnut cutter as an embodiment of the present invention will be explained in detail with reference to the drawings.

EXAMPLE 1

Figure 1:
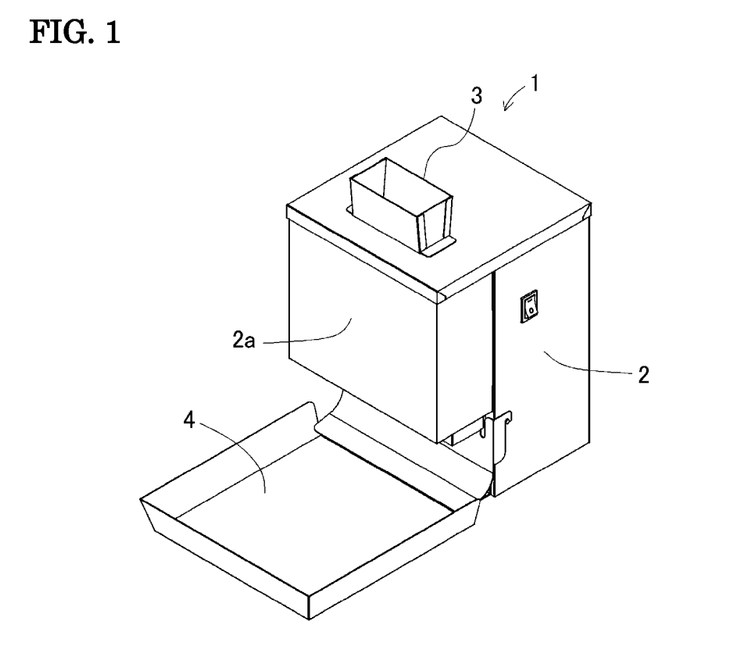
FIG. 1 is a perspective view of a doughnut cutter according to Example 1.

FIG. 1 shows the appearance of a doughnut cutter 1 of Example 1, and the doughnut cutter 1 is a device used to slice various kinds of doughnuts in half in the center of the thickness direction and to provide doughnuts in the state where fresh cream, jam or the like is sandwiched between the doughnut pieces. This doughnut cutter 1 is provided with a housing 2, a feeding port 3 which communicates with the inside of the housing 2, and a palette 4 which protrudes forward at the lower end of the housing 2. A front cover 2a is provided on the housing 2.

Figure 2:
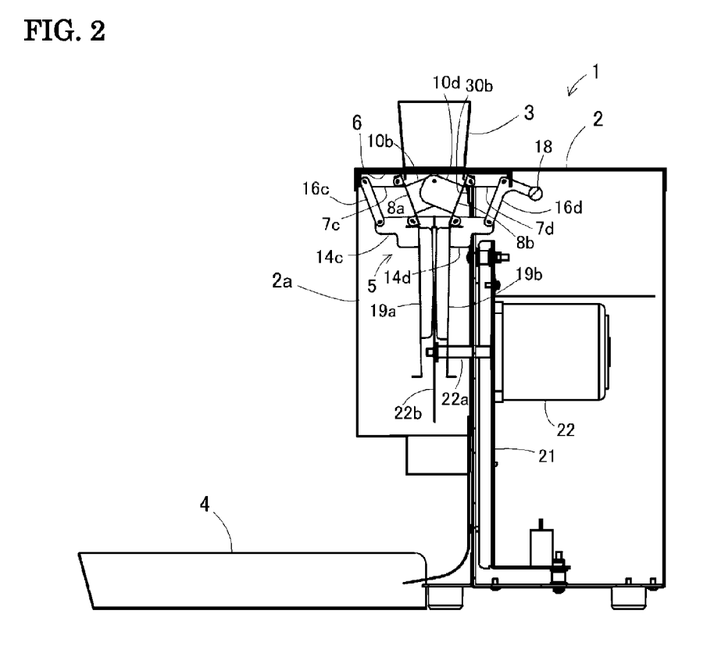
FIG. 2 is a cross sectional view when the doughnut cutter according to Example 1 is viewed from the side.
Figure 3:
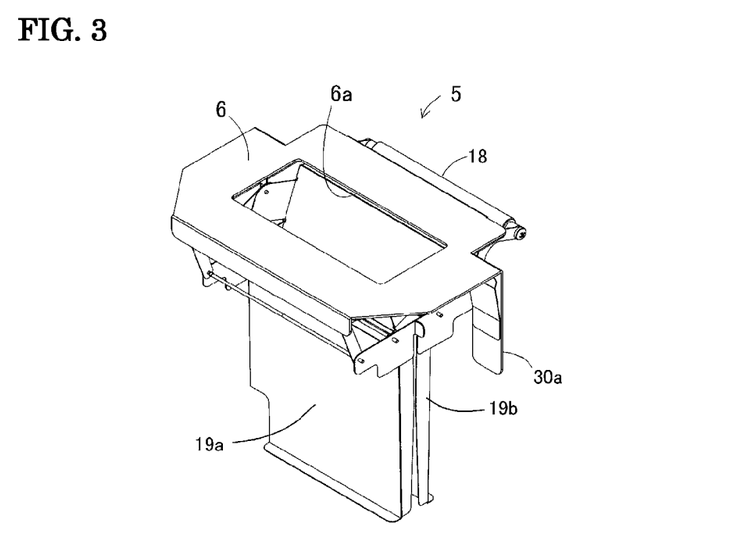
FIG. 3 is a perspective view of a guiding part main body 5 of the doughnut cutter according to Example 1.
Figure 4:
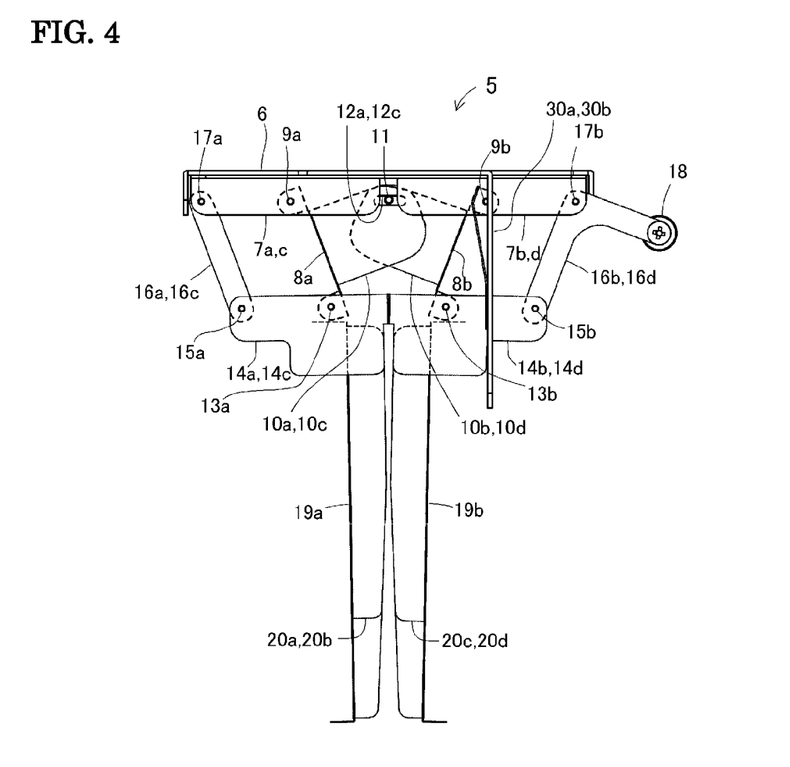
FIG. 4 is a side view of the guiding part main body 5 of the doughnut cutter according to Example 1.

A guiding part main body 5 for guiding doughnuts fed from the feeding port 3 downward is provided within the housing 2, as shown in FIG. 2. A top plate 6 having an opening 6a is provided at the upper end of the guiding part main body 5, as shown in FIG. 3, and the opening 6a communicates with the feeding port 3 (see FIG. 2). Attachment parts 30a, 30b bent and hung downward are provided at two places on both sides of the longitudinal direction of the top plate 6 (see FIG. 4), and fixed on the upper end of the substrate 21 stood in approximately the center of the inside of the housing 2, as shown in FIG. 2. Also, on the rear side of the top plate 6, brackets 7a, 7b, 7c and 7d are attached to 4 places in the vicinity of the opening 6a, as shown in FIG. 4. A tilted plate 8a is coupled via a turning shaft 9a to the brackets 7a, 7c, and a tilted plate 8b is coupled via a turning shaft 9b to the brackets 7b, 7d. Both the tilted plates 8a, 8b are open upward in an inverted truncated chevron shape. Tongue pieces 10a, 10c bent at a right angle are provided on both side ends of the titled plate 8a, and tongue pieces 10b, 10d bent at a right angle are similarly provided on both side ends of the titled plate 8b. The tongue piece 10b and 10d are coupled on both ends of a common fixation shaft 11. On the other hand, slits 12a, 12c are provided in the tongue pieces 10a and 10c, and the fixation shaft 11 is inserted into the slits 12a, 12c. Also, metal fittings 14a, 14c are coupled via a turning shaft 13a to the lower end of the titled plate 8a, and metal fittings 14b, 14d are coupled via the turning shaft 13b to the lower end of the titled plate 8b. Further, poles 16a, 16c are coupled via the turning shaft 15a to one end of the metal fittings 14a, 14c, and L-shaped metal fittings 16b, 16d are coupled via the turning shaft 15b to one end of the metal fittings 14b, 14d. One end of poles 16a, 16c is coupled via the turning shaft 17a to the brackets 7a, 7c, and the L-shaped metal fittings 16b, 16d are coupled via the turning shaft 17b to the brackets 7b, 7d. Further, a weight bar 18 includes an iron round bar is horizontally disposed at the tip ends of the L-shaped metal fittings 16b, 16d by screwing. Between the metal fittings 14a, 14c and the metal fittings 14b, 14d, the guiding plates 19a and 19b are respectively hung and attached so as to be opposite to each other. Parts of both sides of the width direction of the guiding plate 19a are bent to form bending parts 20a, 20b, and parts of both sides of the width direction of the guiding plate 19b are similarly bent to form bending parts 20c, 20d.

Figure 5:
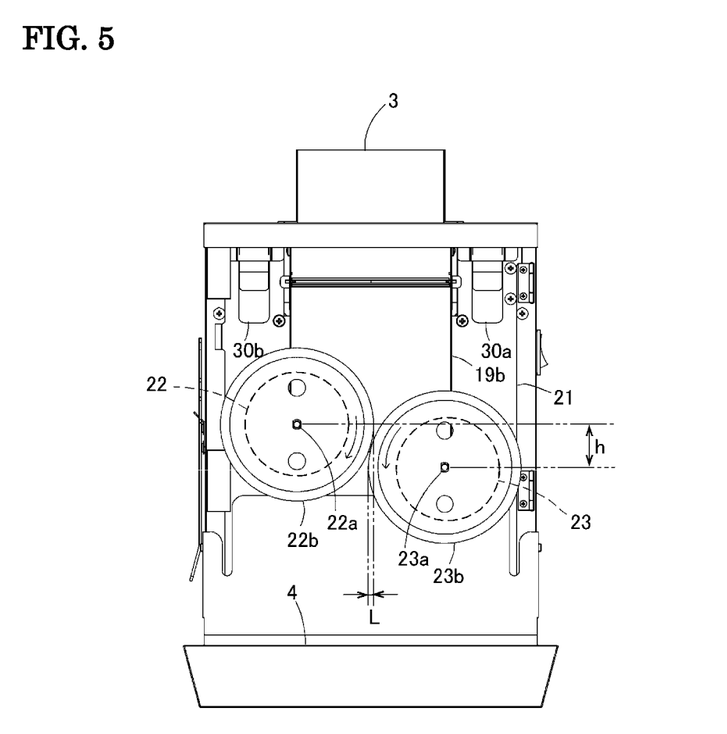
FIG. 5 is a cross sectional view when the doughnut cutter according to Example 1 is viewed from the front side.

A motor 22 is attached to the upper end of the substrate 21 as shown in FIG. 2, and a disk-shaped rotary blade 22b is attached to the rotating shaft 22a of the motor 22 so that the rotary blade 22b is located on the central plane in a clearance between the guiding plates 19a and 19b. Also, a motor 23 is attached to the substrate 21 in a position diagonally below the motor 22, as shown in FIG. 5, and a disk-shaped rotary blade 23b is attached to the rotating shaft 23a of the motor 23 so that the rotary blade 23b is located on the same plane with the rotary plane of the rotary blade 22b. The rotating directions of the motors 22 and 23 are designed so that the rotary blades 22b and 23b rotate mutually reversely in a direction of rolling in doughnuts downward. The straight lines formed by projecting the rotation trajectories of the rotary blades 22b and 23b onto a horizontal plane have an overlapping portion L. Also, the rotating shaft 23a is located in a lower position by a distance h than the rotating shaft 22a.

Next, the action and effect of this doughnut cutter will be described.

The state of the guiding part main body 5 before use is shown in FIG. 4. The L-shaped metal fittings 16b, 16d undergo energizing force in a clockwise direction around the turning shaft 17b due to the own weight of the weight bar 18. This causes the metal fittings 14b, 14d coupled via the turning shaft 15b to the metal fittings 16b, 16d to undergo energizing force in a counterclockwise direction. Further, this energizing force causes the titled plate 8b coupled via the turning shaft 13b to the metal fittings 14b, 14d to undergo energizing force for turning it around the turning shaft 9b to a direction that the tilt angle is an acute angle. Consequently, the fixation shaft 11 fixed to the tongue pieces 10b, 10d turns upward around the turning shaft 9b, and undergoes energizing force for pushing the tongue pieces 10a, 10b upward while moving in the slits 12a, 12c. This causes the tilted plate 8a to undergo energizing force for turning it around the turning shaft 9a to such a direction that the tilt angle is an acute angle. As a result, the metal fittings 14a, 14c undergo rightward energizing force via the turning shaft 13a.

By the link mechanism as described above, due to the own weight of the weight bar 18, the metal fittings 14b, 14d undergo leftward energizing force, and the metal fittings 14a, 14c undergo rightward energizing force. The metal fittings push each other in the central position so as to be in a stop state. Therefore, the distance between the guiding plates 19a and 19b is in the closest state.

Figure 6:
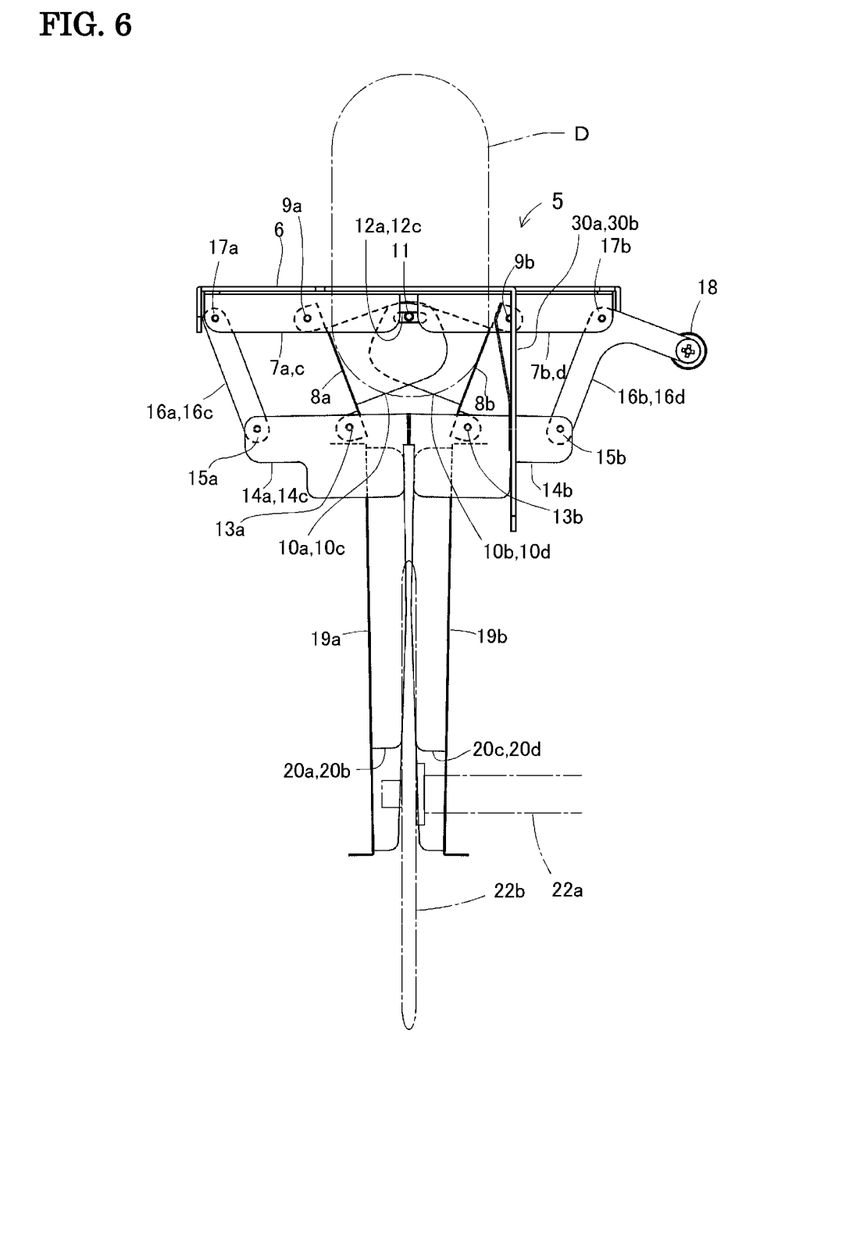
FIG. 6 is a side view showing the state where a doughnut D is in contact with the tilted plates 8a, 8b of the guiding part main body 5.
Figure 7:
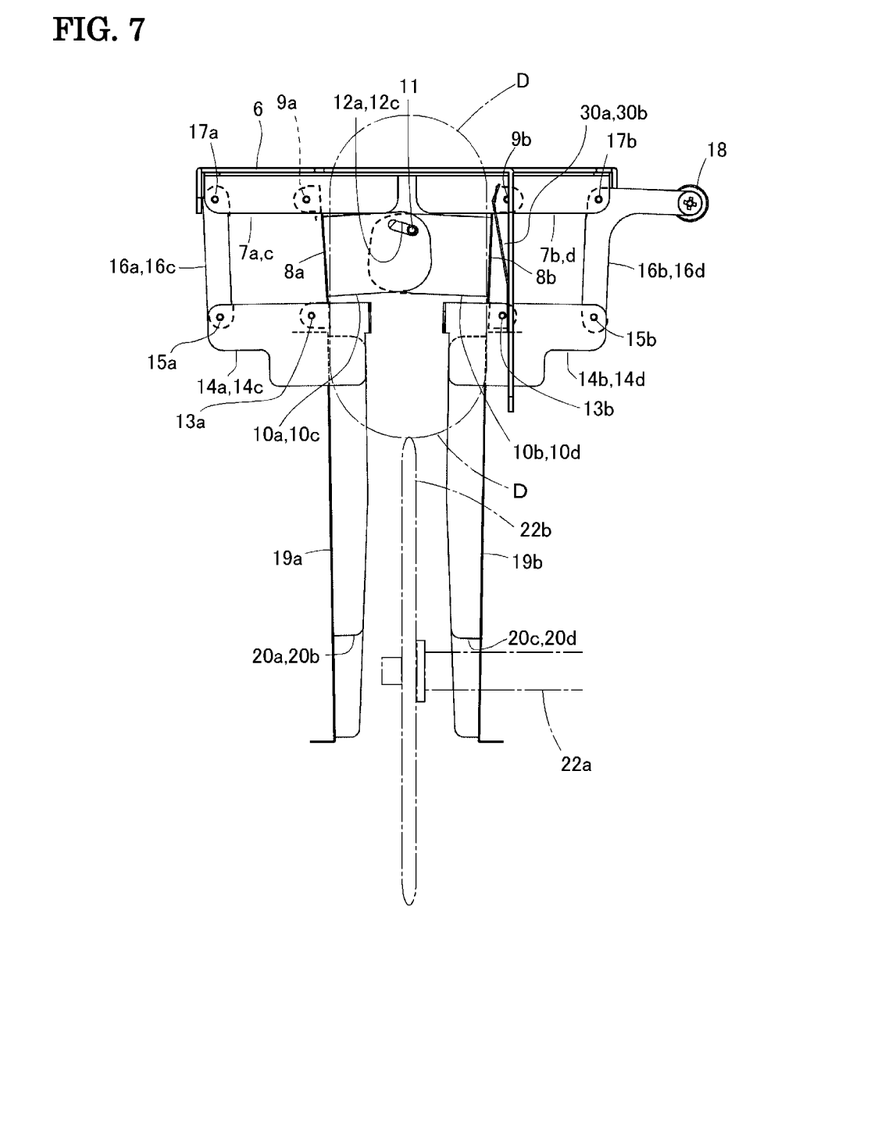
FIG. 7 is a cross sectional view of the guiding part main body 5 showing the state where the doughnut D has started to be cut with a rotary blade 22b.

When the doughnut cutter is used to slice a doughnut, an operator firstly holds the doughnut D in his/her hand, and inserts it from the feeding port 3 of the doughnut cutter 1 shown in FIG. 2 in a vertical direction, and then releases his/her hand from the doughnut. Thus, the doughnut D falls down, and is brought into contact with the tilted plates 8a and 8b to press the titled plates 8a and 8b in a direction of pushing out the tilted plates 8a and 8b, as shown in FIG. 6. Consequently, the tilted plates 8a and 8b turn around the turning shafts 9a, 9b and are pushed out so that the doughnut is further held between the guiding plates 19a and 19b, as shown in FIG. 7. At this time, the doughnut D is pressed from the guiding plates 19a and 19b by the above-described link mechanism due to the own weight of the weight bar 18, guided downward so that it is constantly positioned in the center of a clearance between the guiding plates 19a and 19b, and brought into contact with the rotary blade 22b so that cutting of the doughnut D in the center of the thickness direction is started. With progression of the cutting, the doughnut D comes down due to its own weight, and then is brought into contact also with the rotary blade 23b shown in FIG. 5, cut with both the rotary blades 22b and 23b so as to be rolled in, and slides down to the palette 4 in a state where it is completely sliced in half. The doughnut D passes through the clearance between the guiding plates 19a and 19b, and, at the same time, the guiding plates 19a and 19b and the titled plates 8a and 8b return to the original positions by the energizing force caused due to the own weight of the weight bar 18.

As described above, the doughnut cutter 1 of Example 1 enables any operator to slice the doughnut D in half easily, accurately and rapidly just by feeding the doughnut D from the feeding port 3 shown in FIG. 5. Also, no power other than the power supplies for motive power for the motors 22 and 23 is used.

EXAMPLE 2

Figure 8:
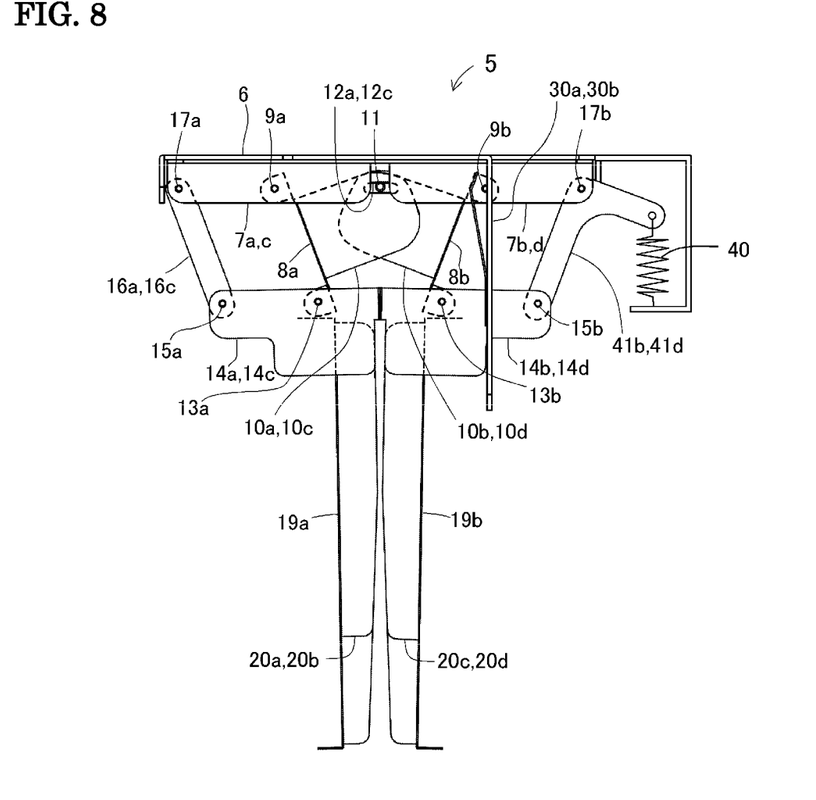
FIG. 8 is a side view of the guiding part main body 5 of a doughnut cutter according to Example 2.

In a doughnut cutter of Example 2, a coil spring 40 is attached to the tip ends of L-shaped fittings 41b, 41d in place of the weight bar 18 in the doughnut cutter of Example 1 (see FIG. 4), and energizes the tip ends of L-shaped fittings 41b, 41d downward. The other components are similar to those of the doughnut cutter of Example 1. The same symbols are added to the same components, and the explanations about these components are omitted.

In the doughnut cutter of Example 2, the coil spring 40 always energizes the tip ends of L-shaped fittings 41b, 41d downward in place of the weight bar 18 in the doughnut cutter of Example 1. Consequently, the doughnut can be pressed from the guiding plates 19a and 19b so as to be guided downward so that it is constantly located in the center of the clearance between the guiding plates 19a and 19b, as is the case with Example 1. Therefore, the action and effect similar to those in Example 1 are obtained, and anyone can slice the doughnut D in half easily, accurately and rapidly just by feeding the doughnut D from the feeding port 3. Also, no power other than the power supplies for motive power for the motors 22 and 23 is used.

This invention is not limited by the explanations about the embodiments of the invention given above. Various modified embodiments are also encompassed in this invention within a scope which would be obvious to those skilled in the art without departing from the scope of the claims.

What is claimed is:

1. A food material cutter comprising:
   a guiding means which guides a food material to a sliceable position; and
   a cutting means having cutting blades for slicing the guided food material,
   wherein the guiding means is provided with a feeding part into which the food material is to be fed, a pair of opposite guiding plates for guiding the food material fed into the feeding part to the cutting means, and a centering mechanism which moves the guiding plates by an equal distance from the center of the clearance between the respective guiding plates while the respective guiding plates matches with the thickness of the food material due to the own weight of the food material fed from the feeding part,
   wherein blade edges of the cutting blades are provided so as to pass over the central plane between the guiding plates, and configured so that the food material guided by the guiding plates is cut in half from the center of the thickness direction by means of the cutting blades,
   wherein the cutting blades comprise a first rotary blade and a second rotary blade which are made rotatable mutually reversely in a direction of rolling in the food material, and are provided on a central plane between the guiding plates, and
   wherein straight lines formed by projecting rotation trajectories of the first and second rotary blades onto a horizontal plane are in contact or overlap with each other.

2. The food material cutter according to claim 1, which is provided with an energizing means which energizes the guiding plates to a direction of narrowing the distance between the guiding plates.

3. The food material cutter according to claim 2, wherein the energizing means energizes the guiding plates due to the own weight of a weight, the guiding plates and the weight being coupled by the link mechanism.

4. A food material cutter comprising:
   a guiding means which guides a food material to a sliceable position; and
   a cutting means having cutting blades for slicing the guided food material,
   wherein the guiding means is provided with a feeding part into which the food material is to be fed, a pair of opposite guiding plates for guiding the food material fed into the feeding part to the cutting means, and a centering mechanism which moves the guiding plates by an equal distance from the center of the clearance between the respective guiding plates while the respective guiding plates matches with the thickness of the food material due to the own weight of the food material fed from the feeding part,
   wherein blade edges of the cutting blades are provided so as to pass over the central plane between the guiding plates, and configured so that the food material guided by the guiding plates is cut in half from the center of the thickness direction by means of the cutting blades, wherein the feeding part has a pair of tilted plates which are open upward, and is configured so that the space between the lower ends of the respective titled plates widens due to the own weight of the food material, and wherein the titled plates are coupled by a link mechanism and also the tilted plates and the guiding plates are coupled by the link mechanism so that the wider the space is, the greater the moving distance from the center of the clearance between the respective guiding plates is.

5. The food material cutter according to claim 4, which is provided with an energizing means which energizes the guiding plates to a direction of narrowing the distance between the guiding plates.

* * * * *